United States Patent

Schulter et al.

[11] Patent Number: 5,379,221
[45] Date of Patent: Jan. 3, 1995

[54] TRIGGER PROCEDURE FOR A VEHICLE OCCUPANT RESTRAINING SYSTEM

[75] Inventors: Wolfgang Schulter, Meersburg; Rolf Schuler, Oberteuringen, both of Germany

[73] Assignee: Temic Telefunken microelectronic GmbH, Heilbronn, Germany

[21] Appl. No.: 51,671

[22] Filed: Apr. 23, 1993

[30] Foreign Application Priority Data

Apr. 25, 1992 [DE] Germany .......................... 4213673

[51] Int. Cl.$^6$ .............................................. B60R 21/32
[52] U.S. Cl. .............................. 364/424.05; 340/436; 307/10.1; 280/735; 180/282
[58] Field of Search ............... 364/424.05; 280/734, 280/735; 180/274, 282; 307/10.1; 340/436, 669

[56] References Cited

U.S. PATENT DOCUMENTS

| | | | |
|---|---|---|---|
| 4,836,024 | 6/1989 | Woehrl et al. | 280/735 |
| 4,842,301 | 6/1989 | Feldmaier | 280/735 |
| 5,034,891 | 7/1991 | Blackburn et al. | 364/424.05 |
| 5,036,467 | 7/1991 | Blackburn et al. | 364/424.05 |
| 5,065,322 | 11/1991 | Mazur et al. | 364/424.05 |
| 5,073,860 | 12/1991 | Blackburn et al. | 364/424.05 |
| 5,109,341 | 4/1992 | Blackburn et al. | 364/424.05 |
| 5,164,901 | 11/1992 | Blackburn et al. | 364/424.05 |
| 5,185,701 | 2/1993 | Blackburn et al. | 364/424.05 |
| 5,251,161 | 10/1993 | Gioutsos et al. | 364/424.05 |
| 5,256,904 | 10/1993 | Tohbaru | 307/10.1 |
| 5,285,187 | 2/1994 | Hirao et al. | 340/436 |

*Primary Examiner*—Kevin J. Teska
*Assistant Examiner*—Tyrone V. Walker
*Attorney, Agent, or Firm*—Spencer, Frank & Schneider

[57] ABSTRACT

A trigger procedure for a restraint system for protection of the occupants in a vehicle, where short-time spectral analyses of at least one acceleration component of the vehicle structure are continuously implemented and at least one parameter characteristic for the deformation of the vehicle structure (trigger parameter) is calculated from several spectral components. The calculated trigger parameters are compared with one or more preset threshold values to make a decision on triggering of the restraint system.

7 Claims, 2 Drawing Sheets

TRIGGER PROCEDURE FOR A VEHICLE OCCUPANT RESTRAINING SYSTEM

DESCRIPTION OF THE PRIOR ART

The invention relates to a procedure of triggering a restraint system for protection of the occupants in a vehicle. By restraint systems are understood in particular air bag systems and pretensioners for seatbelts.

Trigger procedures for restraint systems generally employ the output signals of several acceleration sensors permanently connected to the supporting structure for measuring the driving direction components of the acceleration and the transversal acceleration components. In addition, the output signals of speed sensors are also evaluated.

The trigger criteria in the known procedures are formulated predominantly in the time range, i.e. the measured values for acceleration and speed are incorporated directly into the calculation of the triggering time (e.g. comparison with a preset threshold value).

SUMMARY OF THE INVENTION

The object underlying the invention is to provide a trigger procedure with high triggering dependability with as few input signals as possible being processed.

This object, is attained generally by procedure for a restraint system for protection of the occupants in a vehicle, wherein: short-time spectral analyses of at least one acceleration component of the vehicle structure are continuously implemented; at least one parameter characteristic for the deformation of the vehicle structure (trigger parameter) is calculated from several spectral components; and the calculated trigger parameters are compared with one or more preset threshold values to make a decision on triggering of the restraint system. Embodiments of the invention and a device for implementation of the procedure are the subject of further claims.

In accordance with the invention, short-time spectral analyses are continuously conducted of at least one acceleration component of the supporting structure. By short-time spectral analyses is understood that in each case the acceleration curve measured during each brief time segment is subjected to spectral analysis, with the duration of these time segments being very short in comparison to the expected duration of the overall deceleration. On the basis of the spectra obtained, trigger criteria can be formulated that depend only on single spectral components. From the spectral components in question, so-called trigger parameters that are characteristic for deformation of the supporting structure are calculated, and then compared with preset threshold values. This comparison provides the decision on triggering of the restraint system.

A device for implementation of the procedure in accordance with the invention comprises an acceleration sensor permanently connected to the supporting structure, and a device for analog pre-processing of the acceleration signal. The spectral components of the acceleration signal are evaluated by analog or digital band filters. A calculating unit calculates the trigger parameter from the spectral components and compares it with the threshold value.

The procedure in accordance with the invention and the device for implementation of the procedure are described below in detail on the basis of FIGS. 1 to 3.

BRIEF DESCRIPTION OF THE DRAWINGS

In the figures.

DESCRIPTION OF A PREFERRED EMBODIMENT

Figure 1:
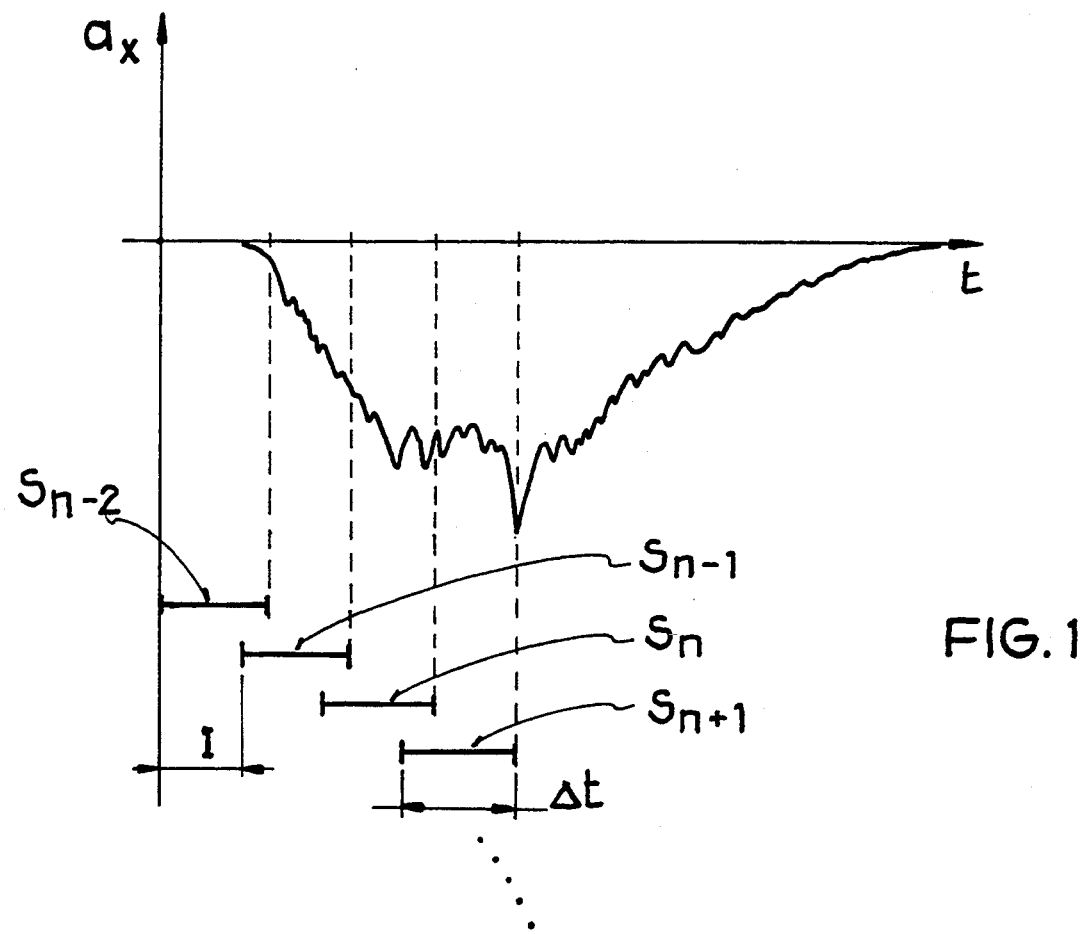
FIG. 1 shows a typical acceleration signal used as the input signal for the procedure in accordance with the invention

FIG. 1 shows the timing of the driving direction component $a_x(t)$ of an acceleration signal that is characteristic for the crash behavior of a certain vehicle type, on the basis of which the procedure in accordance with the invention is described in the following. Since this component is a deceleration, the acceleration has a negative prefix. In accordance with the invention, the acceleration signal is continuously divided up into various time segments $S_n$ (henceforward referred to as frames) with $n = -\infty$ to $+\infty$ of the length $\Delta t$. The segmentation into various frames is preferably selected such that subsequent frames overlap. The time difference between the initial points of two consecutive frames is designated as the interval length $\Phi$. The frame length $\Delta t$ must be substantially less than the total duration of the deceleration process. It does not necessarily have to be constant for all frames $S_n$. Segmentation is preferably achieved by application of a suitable window function to the acceleration signal. Every one of the segments $S_n$ is subjected to spectral analysis (short-time spectral analysis), for example using the known methods of Fast Fourrier Transformation (FFT) or by application of a digital or analog filter bank.

Figure 2:
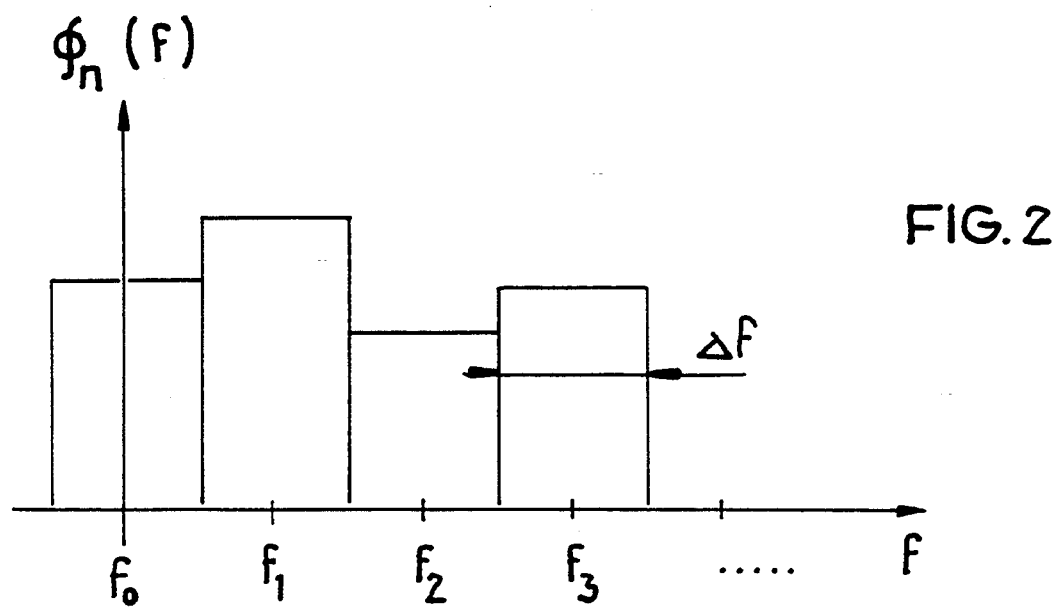
FIG. 2 shows the frequency spectrum of the acceleration signal within a single time segment (short-time spectrum)

FIG. 2 shows the frequency spectrum $\Phi_n(f)$ (short-time spectrum) as the result of the spectral analysis of the nth segment $S_n$ of the acceleration signal $a_x(t)$.

The quantity $\Phi_n(f_i)$ can be interpreted as the acceleration intensity about the frequency $f_i$, based on the band width $\Delta f$. It has the dimension m/s or m/s²/Hz. The quantity $\Phi_n(f_o)$ is designated as the mean value of the acceleration signal (comparable with the first link of a Fourrier series). It can be interpreted as the speed change within the frame in question.

The band width $\Delta f$ of the various frequency constituents is determined by the selection of the frame length $\Delta t$ and the form of window function.

From these spectra, a trigger criterion can be formulated that is based on a few spectral components and is closely linked to a supporting structure deformation in the colliding vehicle, and hence can serve as an adequate condition for triggering of a restraint system. This is explained in more detail in the following using examples.

It has been found that the ratio of the spectrual components $\Phi_n(f_x)$, $\Phi_n(f_y)$ of the main and secondary vibration modes $f_x$, $f_y$ of the vehicle structure can be used as the trigger criterion. The frequencies $f_x$, $f_y$ are calculated in advance for the appropriate vehicle type from crash test databases using, for example, an auto-correlation method (AKF). Triggering should take place whenever $\Phi_n(f_y)$ is of the order of magnitude of $\Phi_n(f_x)$ or is greater than $\Phi_n(f_x)$. By consecutive short-time spectral analyses $n = -\infty$ to $=\infty$ the spectral values $\Phi_n(f_x)$ and $\Phi_n(f_y)$ and their quotient C (trigger parameter) are calculated and compared with a preset trigger threshold trig:

$$C = \Phi_n(f_y)/\Phi_n(f_x) > \text{trig}.$$

When the trigger threshold trig is exceeded, the restraint system is triggered.

To increase the triggering accuracy, further spectral components can be included in the calculation of the trigger parameter C. An example here is the trigger criterion $$C = \Phi_n(f_o) * \Phi_n(f_y)/\Phi_n(f_x) > \text{trig}.$$

Here the quotient $\Phi_n(f_y)/\Phi_n(f_x)$ is additionally weighted with the mean value $\Phi_n(f_o)$.

The inclusion is also possible of spectral components from consecutive frames $\Phi_n, \Phi_{n-1}, \Phi_{n-2}, \ldots$ A particular advantage of the procedure in accordance with the invention is that by evaluation of only one input quantity (in the above examples the driving direction component of the acceleration), dependable triggering can be achieved.

Figure 3:
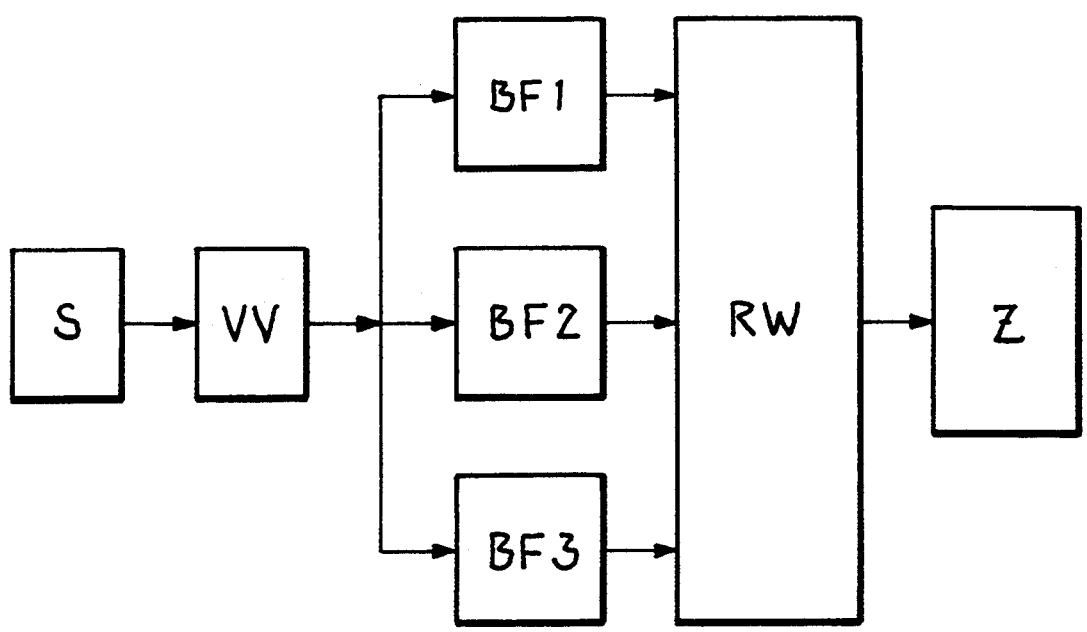
FIG. 3 shows a device for implementation of the procedure.

FIG. 3 is the block diagram of a device for implementation of the procedure. The device comprises an acceleration sensor S, the output signals of which are filtered and then analog-digitally converted in the device VV for analog pre-processing. The spectral components are evaluated with analog or digital band filters BF1, BF2, BF3, with a band filter being provided for each component. For evaluation of the mean value of the acceleration signal a moving-average filter is particularly suitable, and IIR (Infinite Impulse Response) band filters, for example, are used for evaluation of the other spectral components. In a calculating unit RW, the trigger parameters are calculated from the spectral components and the comparison with the threshold values is made. The calculating device RW can also contain algorithms for obtaining the digital band filters. When the threshold values are exceeded, the restraint system is triggered, with the ignition unit Z being activated in the case of an air bag system.

What is claimed is:

1. A trigger procedure for a restraint system for protection of the occupants in a vehicle, comprising the steps of:
   continuously implementing short-time spectral analyses of at least one acceleration component of the vehicle structure;
   calculating, from several spectral components, at least one trigger parameter which is characteristic for the deformation of said vehicle structure and which corresponds to at least one ratio of several of the spectral components;
   comparing the calculated trigger parameters with one or more preset threshold values; and,
   triggering said restraint system when the comparison result is indicative of a collision.

2. A trigger procedure according to claim 1, further comprising including said spectral components of the vibration modes characteristic for said vehicle structure in the calculation of said trigger parameter.

3. A trigger procedure according to claim 2, further comprising including spectral components of the main and secondary vibration modes of the vehicle structure in the calculation of said ratio of said trigger parameter.

4. A trigger procedure according to claim 3, further comprising determining the mean value of the acceleration signal and including same in the calculation of said trigger parameter.

5. A trigger procedure according to claim 1, including using the following criterion for said steps of calculating and comparing:

$$C = \Phi_n(f_o) * \Phi_n(f_y)/\Phi_n(f_x) > \text{trig}.$$

where
C: trigger parameter,
trig: threshold value,
$\Phi_n(f_x)$: spectral component of a main vibration mode $F_x$ of vehicle structure,
$\Phi_n(f_y)$: spectral component of secondary vibration mode $f_y$ of vehicle structure,
$\Phi_n(f_o)$: mean value of acceleration signal,
n: current No. of short-time spectral analyses.

6. A trigger procedure according to claim 1, further comprising including spectral components from consecutive short-time spectral analyses in the calculation of said trigger parameter.

7. A circuit for implementing a trigger procedure for a restraint system for protection of the occupants in a vehicle comprising:
   at least one acceleration sensor mounted on the vehicle for producing an acceleration signal;
   a device for analog pre-processing of said acceleration signal;
   a plurality of band filters, each for the evaluation of a respective spectral component of said acceleration signal, connected to receive the output of said device; and,
   a calculation unit, connected to receive the output signals of said band filters, for calculation of at least one trigger parameter, which is characteristic for the deformation of said vehicle structure, from a ratio of at least several of said spectral components, and for comparison of said at least one trigger parameter with at least one preset threshold value to produce a trigger signal to actuate the restraint systems depending on the results of the comparison.

* * * * *